(12) United States Patent
Xiang (10) Patent No.: US 8,990,625 B2
(45) Date of Patent: Mar. 24, 2015

(54) RUNTIME SYSTEM FAULT TREE ANALYSIS METHOD, SYSTEM AND PROGRAM

(75) Inventor: Jianwen Xiang, Tokyo (JP)

(73) Assignee: NEC Corporation, Tokyo (JP)

(*) Notice: Subject to any disclaimer, the term of this patent is extended or adjusted under 35 U.S.C. 154(b) by 182 days.

(21) Appl. No.: 13/642,301

(22) PCT Filed: Apr. 21, 2011

(86) PCT No.: PCT/JP2011/059794
§ 371 (c)(1),
(2), (4) Date: Oct. 19, 2012

(87) PCT Pub. No.: WO2011/132730
PCT Pub. Date: Oct. 27, 2011

(65) Prior Publication Data
US 2013/0042167 A1 Feb. 14, 2013

(30) Foreign Application Priority Data
Apr. 22, 2010 (JP) ................. 2010-099259

(51) Int. Cl.
*G06F 11/00* (2006.01)
*G06Q 10/10* (2012.01)

(52) U.S. Cl.
CPC .................................... *G06Q 10/10* (2013.01)
USPC .................. 714/37; 714/25; 714/26

(58) Field of Classification Search
CPC . G06F 11/22; G06F 11/2247; G06F 11/2257; G06F 11/24; G06F 11/30; G06F 11/3003; G06F 11/302; G06F 11/3055; G06F 11/321; G06F 11/324; G06F 11/328; G06F 11/3447; G06F 11/3466

USPC ........ 714/25, 26, 33, 37, 38.1, 39, 45, 46, 48, 714/51, 57, 786
See application file for complete search history.

(56) References Cited

U.S. PATENT DOCUMENTS

| 2003/0028823 | A1* | 2/2003 | Kallela et al. ............. 714/26 |
| 2009/0083576 | A1* | 3/2009 | Vlassova et al. .......... 714/26 |
| 2009/0106593 | A1* | 4/2009 | Bluvband et al. ......... 714/37 |
| 2009/0113248 | A1* | 4/2009 | Bock et al. ................ 714/39 |
| 2009/0323539 | A1* | 12/2009 | Wang et al. ............. 370/248 |

FOREIGN PATENT DOCUMENTS

| JP | 5-165853 A | 7/1993 |
| JP | 2000-235507 A | 8/2000 |
| JP | 2003-216923 A | 7/2003 |

OTHER PUBLICATIONS

W.E. Vesely et al., "Fault Free Handbook", U.S. Nuclear Regulatory Commission, NUREG-0492, Jan. 1981, pp. VII-15.
Kirsten M. Hansen et al., "From Safety Analysis to Software Requirements", IEEE Transactions on Software Engineering, Jul. 1998, pp. 573-584, vol. 24, No. 7.
International Search Report for PCT/JP2011/059794 dated Aug. 2, 2011.

* cited by examiner

*Primary Examiner* — Joseph D Manoskey
(74) *Attorney, Agent, or Firm* — Sughrue Mion, PLLC (57) ABSTRACT

The original MCS of a system fault tree includes sufficient conditions required for a top system hazard. If a fault occurs in a component and the component is restored, the current MCS of a system and the critical components can be calculated on the basis of the original MCS by means of several calculation patterns.

9 Claims, 9 Drawing Sheets

| Possible Traditional MCS | $(C1 \wedge C2) \vee (S \wedge C1) \vee (S \wedge C2)$ |
|---|---|
| Candidate Temporal MCS | $(C1 \wedge C2) \vee (S \wedge G1 \wedge \neg C1 \wedge \lozenge (C1 \wedge S \wedge G1)) \vee (S \wedge G2 \wedge \neg C2 \wedge \lozenge (C2 \wedge S \wedge G2))$ |
| Our Original MCS | $(C1 \wedge C2) \vee (C1 \wedge S \wedge G1) \vee (C2 \wedge S \wedge G2)$ |
| Example Initial MCS (Assume G1=True $\wedge$ G2=False) | $(C1 \wedge C2) \vee (C1 \wedge S)$ |

FIG. 8

| Gate | Graphic Notation | Traditional FTA | Candidate LTL Solution | Our Method |
|---|---|---|---|---|
| INHIBIT gate |  | $A = B$ | $A = B \wedge C$ | $A = B \wedge C$ |
| PAND gate |  | $A = B \wedge C$ ? | $A = B \wedge \neg C \wedge \lozenge (B \wedge C)$ | $A = B \wedge C$ (G could be included in B or C) |

FIG. 9

| State No. | History | | Guard Condition | Runtime Minimal Cut Sets | Single Point of Failures / System Fault |
|---|---|---|---|---|---|
| | Original | Simplified | | | |
| 1 | nil (initial) | None | G1 | (C1 ∧ C2) ∨ (S ∧ C1) | N/A |
| 1.1 | <C1> | C1 | G2 | C2 | C2 |
| 1.2 | <S> | S | G1 | C1 | C1 |
| 1.3 | <C2> | C2 | G1 | C1 | C1 |
| 1.1.1 | <C1, S> | C1 ∧ S | G2 | C2 | C2 |
| 1.2.1 | <S, C1> | S ∧ C1 | G1 | True | T (system failed) |
| 1.2.2 | <S, ¬S> | None | G1 | (C1 ∧ C2) ∨ (S ∧ C1) | N/A |
| 1.1.1.1 | <C1, S, ¬S> | C1 | G2 | C2 | C2 |
| 1.1.1.1.1 | <C1, S, ¬S, ¬C1> | None | G2 | (C1 ∧ C2) ∨ (S ∧ C2) | N/A |

FIG. 10

| Original MCS | Most Recent MCS | Simplified History | Previous GC | Current GC | Most Recent Event | Runtime MCS Patterns | |
|---|---|---|---|---|---|---|---|
| M* | M | H | G' | G | C | G = G' | Reduce M under C = true |
| | | | | | | G ≠ G' | Reduce M* under (G = True) ∧ (H = True) |
| | | | | | ¬ C | Reduce M* under (G = True) ∧ (H = True) | |

FIG. 11

RUNTIME SYSTEM FAULT TREE ANALYSIS METHOD, SYSTEM AND PROGRAM

CROSS REFERENCE TO RELATED APPLICATIONS

This application is a National Stage of International Application No. PCT/JP2011/059794 filed Apr. 21, 2011, claiming priority based on Japanese Patent Application No. 2010-099259 filed Apr. 22, 2010, the contents of all of which are incorporated herein by reference in their entirety.

TECHNICAL FIELD

The present invention is concerned with methods and systems for qualitative analysis of system reliability at runtime, especially with the methods and systems for calculation of critical components, such as single point of failures, of a system at runtime with occurrences of component failures and recoveries, and a program therefor.

BACKGROUND ART

Figure 11:
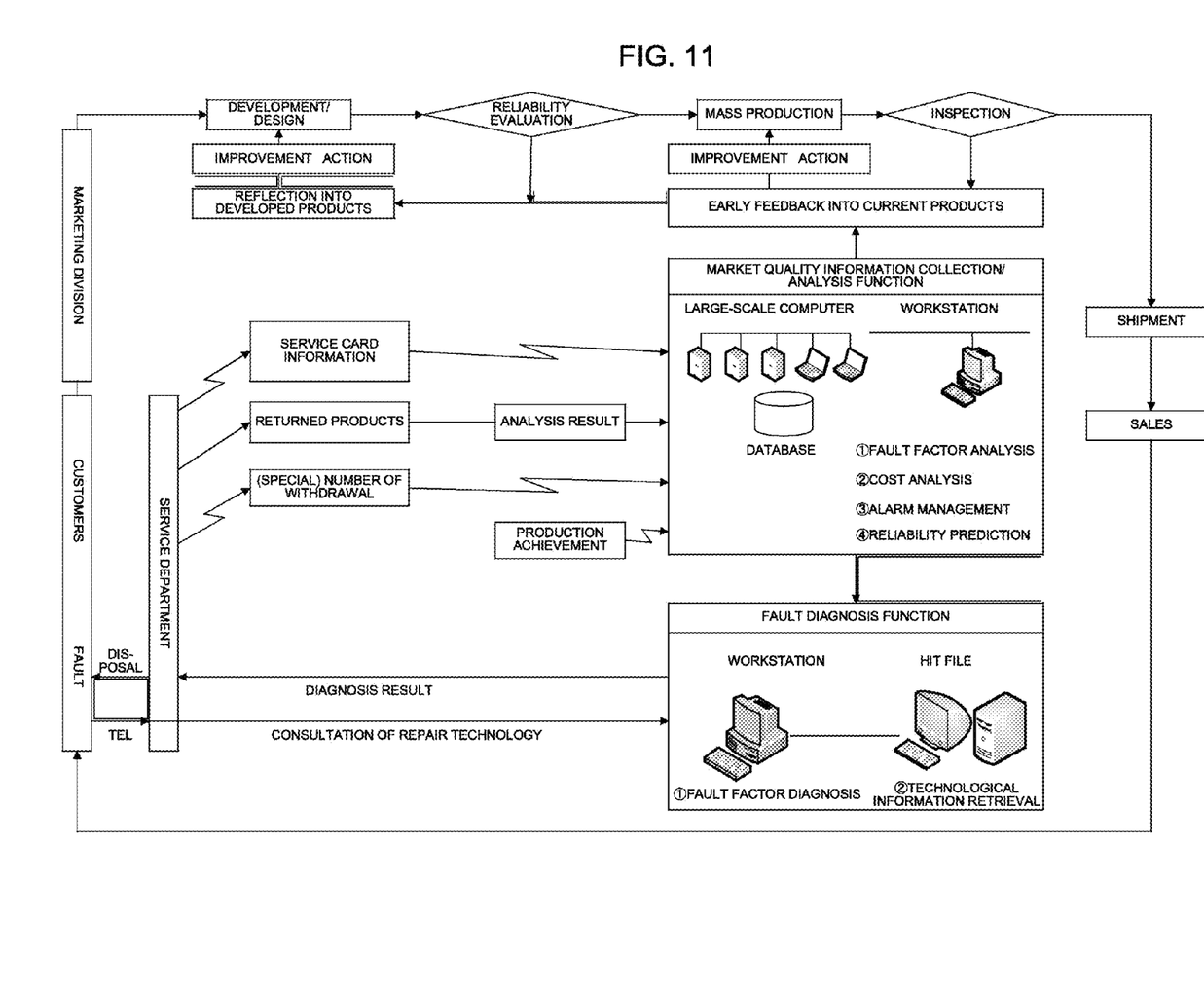
FIG. 11 is an entire configuration view of the system in the case of carrying out the invention of the Patent literature 1.
Figure 12:
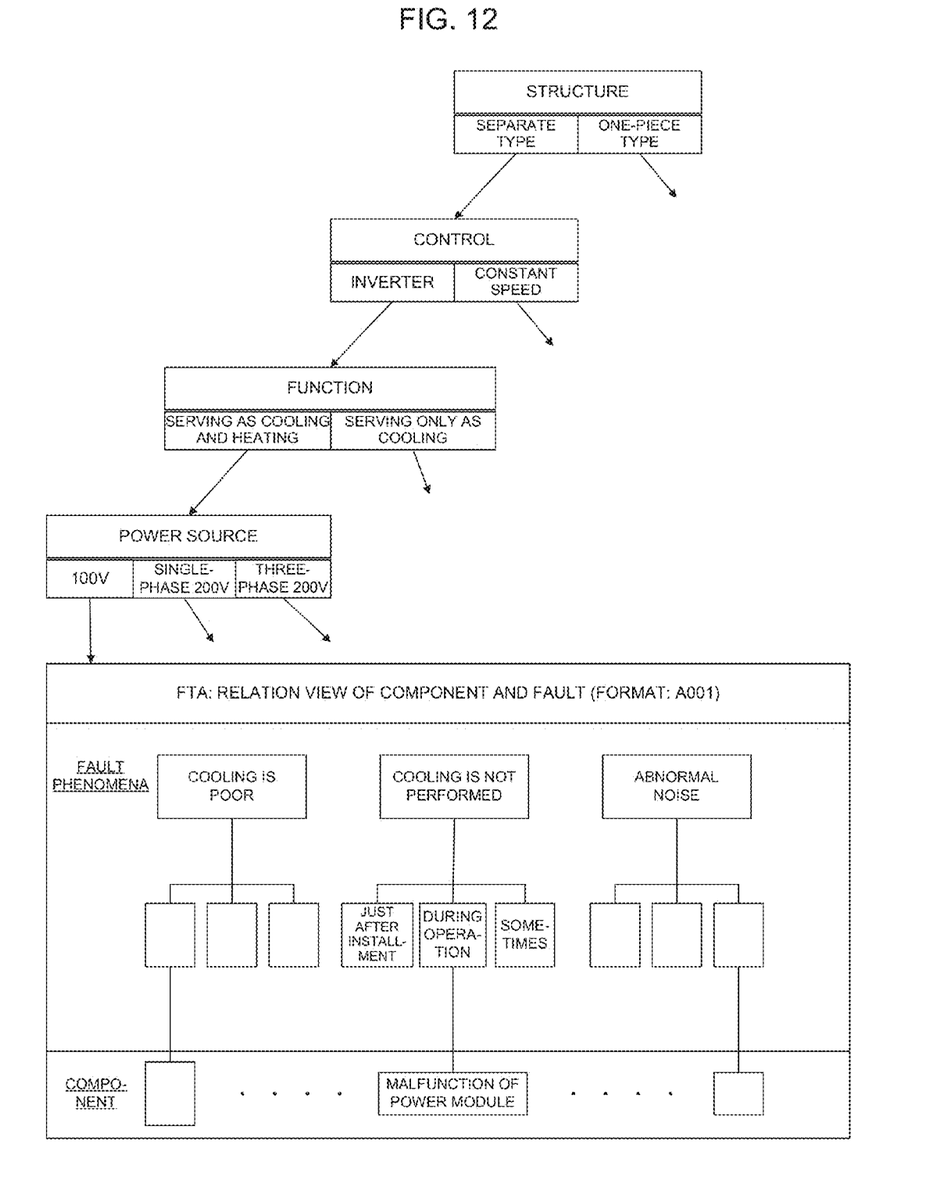
FIG. 12 is a view illustrating a hierarchical structure of a tree indicating a relation of cause and effect of the fault, which is subjected to be observed, in the fault diagnosis of the Patent literature 1.

Quality information diagnosis related to the present invention is presented in Patent literature 1. As shown in FIG. 11 and FIG. 12, such a previous method uses fault tress to diagnose potential component failures with respect to some particular system failures reported by users. This is a typical application of fault tree analysis (FTA) in a top-down way.

However, this method cannot answer the reverse question, that is, what are the current critical components in the occurrences of some other component failures and recoveries at runtime, which is especially a key concern of fault tolerant systems in practice.

Direct applying traditional FTA in a bottom-up way may have troubles to solve the above problem. This is because that the traditional FTA does not consider conditional events (i.e., normal events which are not considered as faults) in the minimal cut sets (MCS), and it may have troubles to handle with sequential dependency between different events due to its simple Boolean logic semantics. To illustrate it, we refer to Non-patent literature 1, in which a minimal cut set is defined as a smallest combination of component failures which, if they all occur, will cause the top event to occur. Here the top event is typically understood as the highest level of undesired system hazard, i.e., the root of the fault tree. Without considering necessary conditional events in the fault tree, such a definition may just fail for the analysis of runtime MCS. Here by runtime MCS we mean the current MCS of the fault tree in the occurrences of some component failures and recoveries, which is important to predict the current critical components of the system at runtime.

Temporal fault trees may help to solve the sequential dependency problem of traditional fault trees, such as the one presented in Non-patent literature 2.

However, if temporal operators have been introduced into the MCS of fault trees, then it may increase the complexity and cost for the calculation of runtime MCS since the sequences rather than combinations of component failures are typically required for consideration.

CITATION LIST

Patent Literature

PTL 1: JP-P1993-165853A (pp. 5 to 7, and FIGS. 1 and 6)

Non-Patent Literature

NON-PTL 1: W. E. Vesely, F. F. Goldberg, N. H. Roberts, and D. F. Haasl, Fault Tree Handbook, U.S. Nuclear Regulatory Commission, NUREG-0492, January 1981, pp. VII-15.

NON-PTL 2: K. M. Hansen, A. P. Ravn, and V. Stavridou, From Safety Analysis to Software Requirements, IEEE Transactions on Software Engineering, Vol. 24, No. 7, July 1998.

SUMMARY OF INVENTION

Technical Problem

The problem of the above-described inventions is that the MCS of traditional FTA is defined in a rather informal way, and it does not capture all the sufficient and necessary conditions for the top events of the fault trees. This is because that the traditional FTA does not consider normal conditional events in the MCS, and it does not have a clear definition about the MCS of sequential dependency gates such as Priority AND (PAND) gates. A PAND gate is special AND gate in which its output event occurs if and only if all the sub events occur in a particular order from left to right. Consequently, it is difficult or even impossible to analyze runtime MCS and find out the critical components in a correct way, especially when the fault trees comprise the conditional events and/or PAND gates.

Thereupon, the present invention has been accomplished in consideration of the above-mentioned problems, and an object of the present invention is to provide a method and a system for analyzing system reliability to find out critical components at runtime in terms of the occurrences of component failures and recoveries.

Means for Solving Problem

The present invention for solving the above-mentioned problems is a system for analyzing system reliability at runtime to find out critical components of a system based on a history of component failures and recoveries and necessary observations of some guard conditions which are normal states of some components, which includes a fault tree input means that inputs fault trees of the system to be analyzed, a fault tree analysis means that calculates original and runtime minimal cut sets (MCS) of the fault trees of the system, and a history and monitoring means that records the history of component failures and recoveries, and observes the status of the guard conditions included in the aforementioned original MCS.

The present invention for solving the above-mentioned problems is a fault tree analysis method of analyzing system reliability at runtime to find out critical components of a system based on a history of component failures and recoveries and necessary observations of some guard conditions which are normal states of some components, which includes a step of inputting fault trees of the system to be analyzed, a step of calculating original and runtime minimal cut sets (MCS) of the fault trees of the system, and a step of recording the history of component failures and recoveries, and observing the status of the guard conditions included in the aforementioned original MCS.

The present invention for solving the above-mentioned problems is a program of a fault tree analysis method of analyzing system reliability at runtime to find out critical components of a system based on a history of component failures and recoveries and necessary observations of some guard conditions which are normal states of some components, which causes an information processing device to execute a process of inputting fault trees of the system to be analyzed, a process of calculating original and runtime minimal cut sets (MCS) of the fault trees of the system, and a process of recording the history of component failures and recoveries, and observing the status of the guard conditions included in the aforementioned original MCS.

Advantageous Effect of Invention

The present invention makes it possible to calculate the MCS and the critical components of the system at runtime, given the fault tree, and the history of component failures and recoveries as well as necessary observations of some guard conditions. The reason is that the runtime MCS can be calculated based on the observations of the history of component failures and recoveries, and the status of necessary guard conditions included in the original MCS of the fault tree.

DESCRIPTION OF EMBODIMENTS

An outline of the present invention will be explained.

The proposed runtime system reliability analysis method and system include a fault tree input means, a fault tree analysis means, and a history and monitoring means. The fault tree input means is used to input the fault tree of the system to be analyzed. The fault tree analysis means is used to calculate the original MCS of the fault tree inputted from the aforementioned fault tree input means, and the runtime MCS of the fault tree based on observation values provided by the aforementioned history and monitoring means below. Note that the aforementioned original MCS of the fault tree is calculated based on an empty set of observation values, i.e., no observation is available in the aforementioned history and monitoring means in the initialization of the system.

The history and monitoring means is used to record the history of component failures and recoveries and monitor the status of the guard conditions so as to provide a set of observation values for the calculation of runtime MCS of the fault tree. Note that the observed components and guard conditions are denoted as the basic fault and conditional events in the aforementioned original MCS of the fault tree, respectively.

With such a structure, the MCS as well as the critical components of the system can be calculated at runtime in terms of the component failures and recoveries.

Next, the implementation modes of the present invention will be explained in details by referring to the accompanied drawings.

Figure 1:
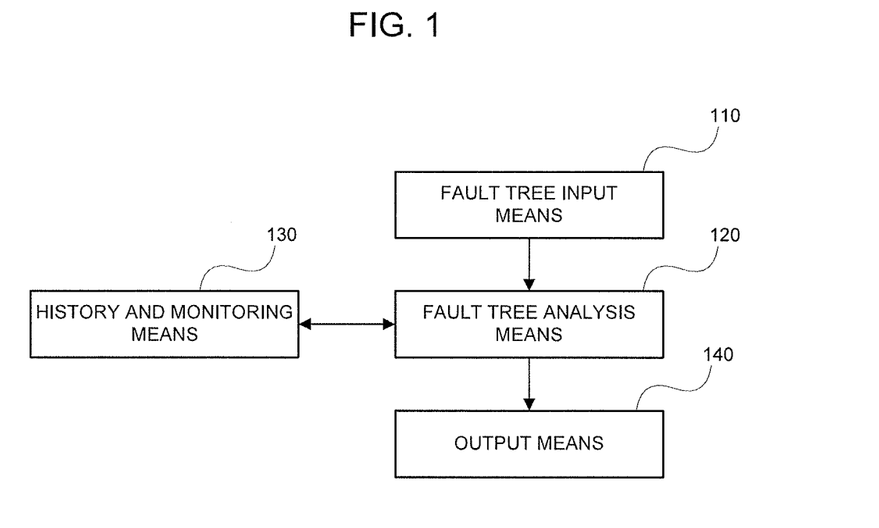
FIG. 1 is a block diagram illustrating a configuration of the best mode for carrying out a first invention of the present invention.

Referring to FIG. 1, the first implementation mode of the present invention includes a fault tree input means 110, a fault tree analysis means 120, a history and monitoring means 130, and an output means 140.

Operations of these means are summarized as follows, respectively.

The fault tree input means 110 inputs the fault tree of the system to be analyzed.

The fault tree analysis means 120 calculates the original and runtime MCS of the fault tree inputted from the aforementioned fault tree input means 110.

The history and monitoring means 130 records the history of component failures and recoveries and monitors the current status of the guard conditions included in the original MCS calculated from the aforementioned fault tree analysis means 120. The observation values of the history and monitoring means 130 are also used to calculate the runtime MCS by the aforementioned fault tree analysis means 120.

The output means 140 allows the current MCS (i.e., original and runtime MCS) calculated from the aforementioned fault tree analysis means 120 to be transferred into other components for displaying and/or further analysis (e.g., quantitative analysis of system reliability).

Figure 2:
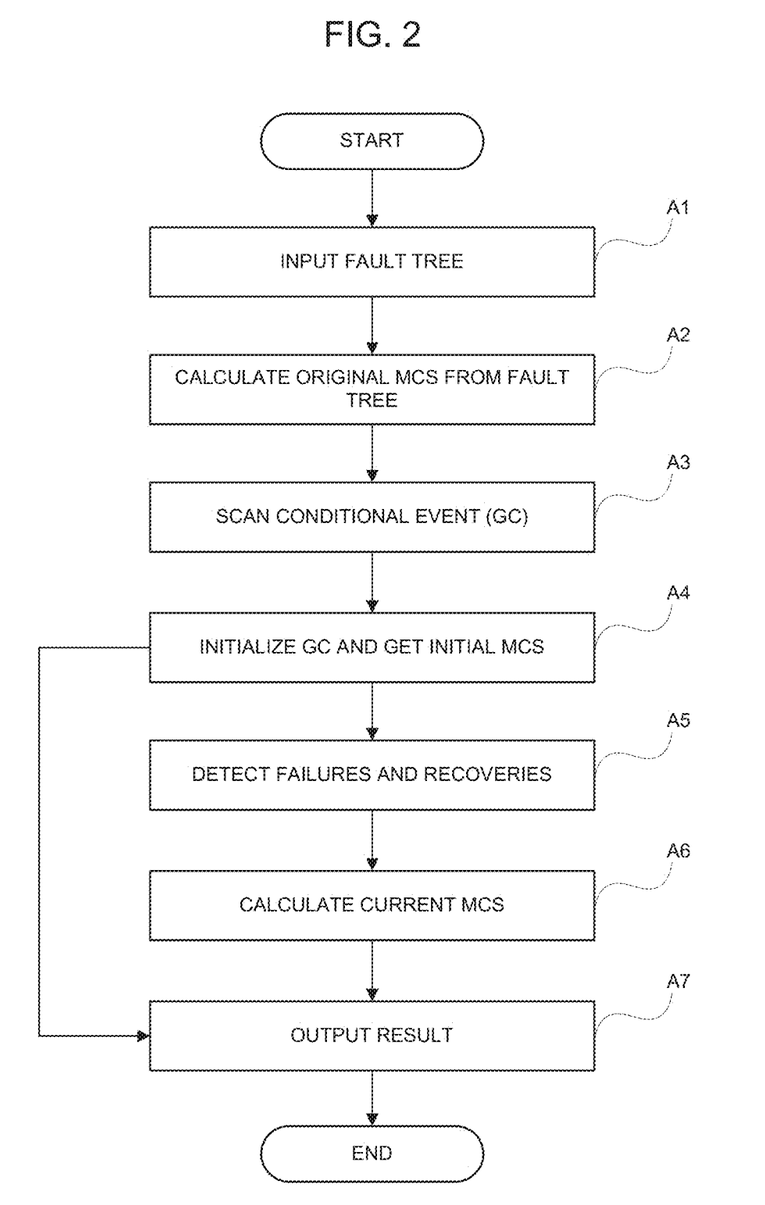
FIG. 2 is a flowchart illustrating an operation of the best mode for carrying out the first invention.

Next, an entire operation of this implementation mode will be explained in details by referring to flowcharts of FIG. 1 and FIG. 2.

Firstly, the fault tree of the system is inputted by the aforementioned fault tree input means 110 (Step A1). The original MCS of the fault tree is then calculated by the aforementioned fault tree analysis means 120 (Step A2). After getting the original MCS, the system scans the conditional events in the original MCS and lists them as guard conditions (GC) in addition to the component failures of the original MCS which are subjected to be observed by the aforementioned history and monitoring means 130 (Step A3).

By initializing the GC with Boolean values True or False according to a specific system initial state, the initial MCS of the system can be calculated in terms of the original MCS with the initialization of the GC (Step A4). Note that the initial MCS contain no conditional events, since they have been evaluated (i.e., initialized) and their values are denoted by a separated observation of the GC. To illustrate it, an example initial MCS in contrast to the original MCS is presented in FIG. 7. All the subsequent runtime MCS follow this rule of separation of concerns. The initial MCS could be transferred to the aforementioned output means 140 since it is also a current MCS in the system initial state.

After initialization, the system detects any event of component failure or recovery (Step A5). If such an event occurs, the system calculates the current MCS based on the aforementioned original MCS with the necessary observation values of GC and component failures observed from the aforementioned history and monitoring means 130 (Step A6). The calculation is performed by the aforementioned fault tree analysis means 120.

Finally, the result of the current MCS can be transferred to the aforementioned output means 140 for output or further analysis (Step A7).

Next, an effect of this implementation mode will be explained.

This implementation mode includes calculation of original MCS, detection of component failures and recoveries, and observation of guard conditions, and thus the current MCS can be calculated.

Next, a second implementation mode of the present invention will be explained in details by referring to the accompanied drawings.

Figure 3:
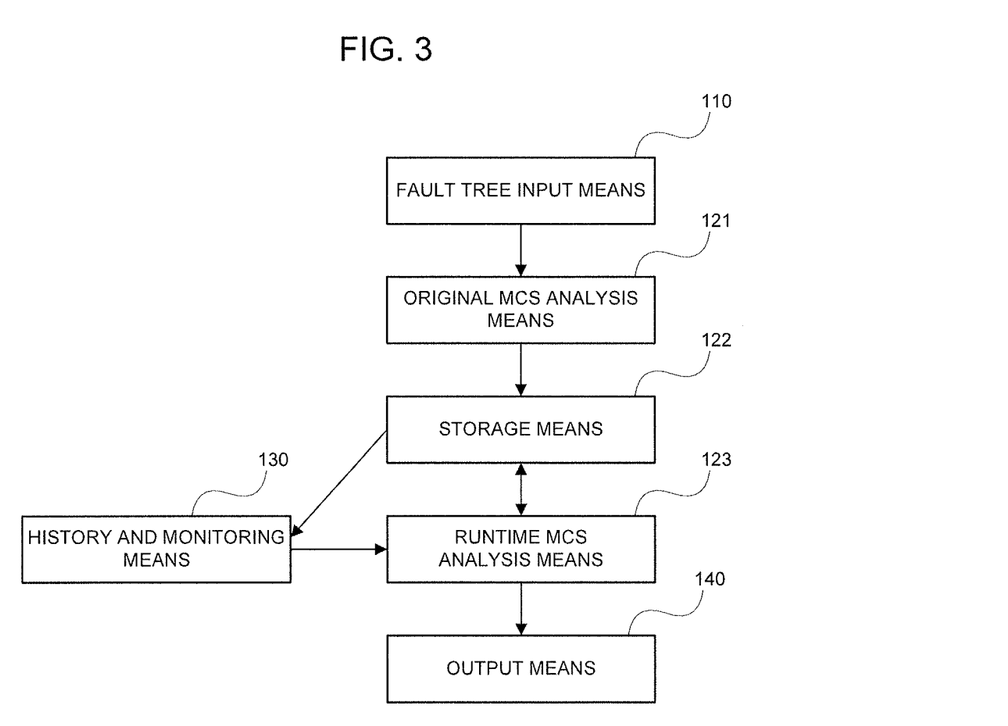
FIG. 3 is a block diagram illustrating a configuration of the best mode for carrying out a second invention of the present invention.

Referring to FIG. 3, the second implementation mode of the present invention is an extension of the first implementation mode, in which the aforementioned fault tree analysis means 120 of the first implementation mode is replaced by an original MCS analysis means 121, a storage means 122, and a runtime MCS analysis means 123 to enhance the efficiency of calculation of runtime MCS.

Operations of these means are summarized as follows, respectively.

A fault tree input means 110, a history and monitoring means 130, and an output means 140 of the second implementation mode are the same as those in the first implementation mode, respectively.

The original MCS analysis means 121 calculates the original MCS of the fault trees inputted from the aforementioned fault tree input means 110.

The storage means 122 saves the original MCS calculated from the aforementioned original MCS analysis means 121 and the most recent MCS calculated from the aforementioned runtime MCS analysis means 123.

The runtime MCS analysis means 123 calculates the current MCS based on the history of component failures and recoveries as well as the current status of the guard conditions observed from the aforementioned history and monitoring means 130, and the most recent or original MCS saved in the aforementioned storage means 122. The result is used to update the most recent MCS of the aforementioned storage means 122.

Next, an entire operation of this implementation mode will be explained in details by referring to flowcharts of FIG. 3 and FIG. 4.

Explanation of the steps B1 to B4, which are similar to the steps A1 to A4 of the first implementation mode, is omitted, and a difference between them will be explained. The difference is that the original MCS is calculated by the aforementioned original MCS analysis means 121 of this implementation mode (Step B2). After Step B4, the resulting initial MCS are saved in the aforementioned storage means 122 as the most recent MCS for further calculations (Step B5).

After initialization, the system detects any event of the occurrence of component failure or recovery (Step B6). If the event is a component failure, then the system further checks whether the GC have been changed by the component failure. If the GC have not been changed, then the current MCS can be calculated based on the most recent MCS saved in the aforementioned storage means 122 (Step B7), otherwise the current MCS should be calculated based on the original MCS and the current observation values of the GC (Step B8).

Again, the calculated current MCS are saved in the aforementioned storage means 122 as the most recent MCS for the next calculation. The calculation of the current MCS is done by the aforementioned runtime MCS analysis means 123.

The result of the most recent MCS can be transferred to the aforementioned output means 140 for output or further analysis (Step B9).

Figure 4:
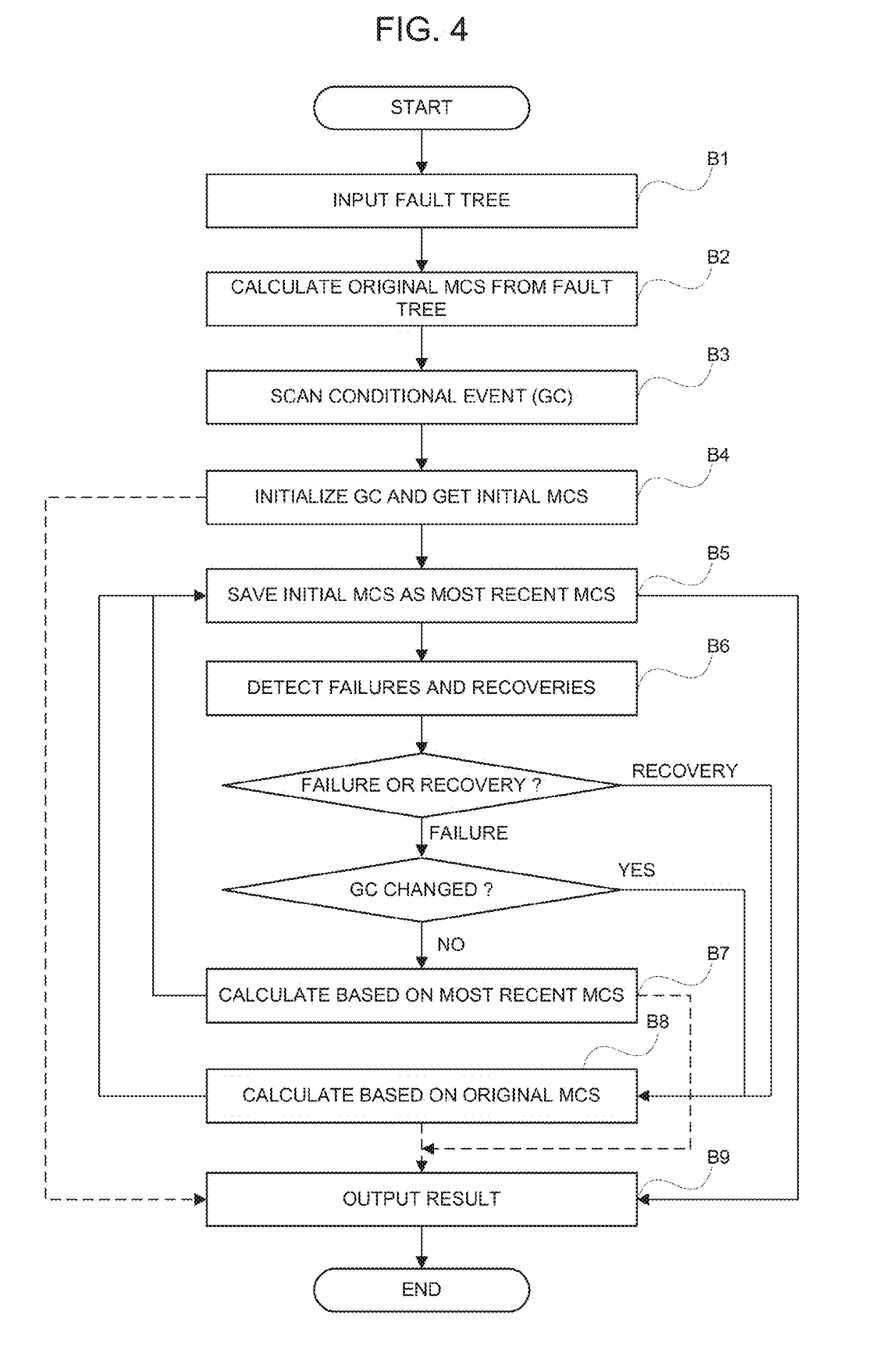
FIG. 4 is a flowchart illustrating an operation of the best mode for carrying out the second invention.

Instead of outputting the most recent MCS saved in the aforementioned storage means 122, the calculated initial and current MCS could be transferred to the aforementioned output means 140 directly, which are denoted by the dashed arrows in FIG. 4.

Next, en effect of this implementation mode will be explained.

This implementation mode includes a storage means for saving the most recent MCS, and a separated original and runtime MCS analysis means. Since the most recent MCS is a subset of the original MCS in general, the efficiency of calculation of the current MCS could be enhanced, especially in the case of large complex systems whose original MCS are considerably complex.

EXAMPLE 1

Next, an operation of the best mode for carrying out the present invention will be explained by using specific examples.

Figure 5:
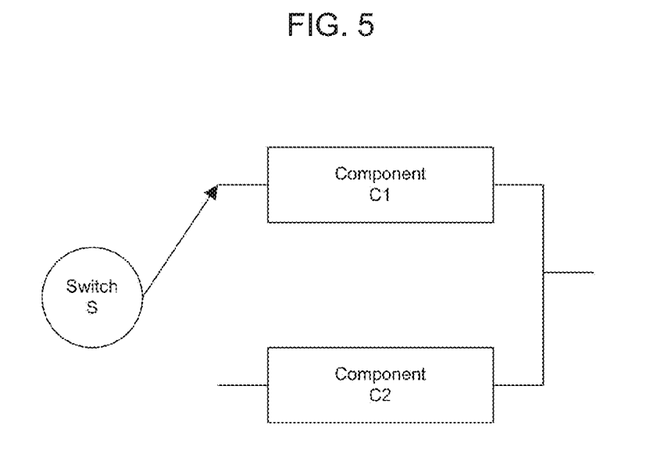
FIG. 5 is a view illustrating a system model, being a specific example of an operation of the best mode for carrying out the invention.

A system model of a simple example dual system is shown in FIG. 5.

We assume that the system consists of two components, C1 and C2, and the system works if any of them works. In case any of these two components fails, a switch S will change to the other component and activate it, provided that the switch and the other component do not fail. Further, we also assume that initially, the switch S is connected to the component C1.

For a better understanding of the present invention, we will follow the procedure depicted by the second implementation mode of the present invention (see FIG. 3 and FIG. 4), since the first implementation mode could be regarded as a simplification of the second one and it is less efficient for the analysis of large systems in general.

Figure 6:
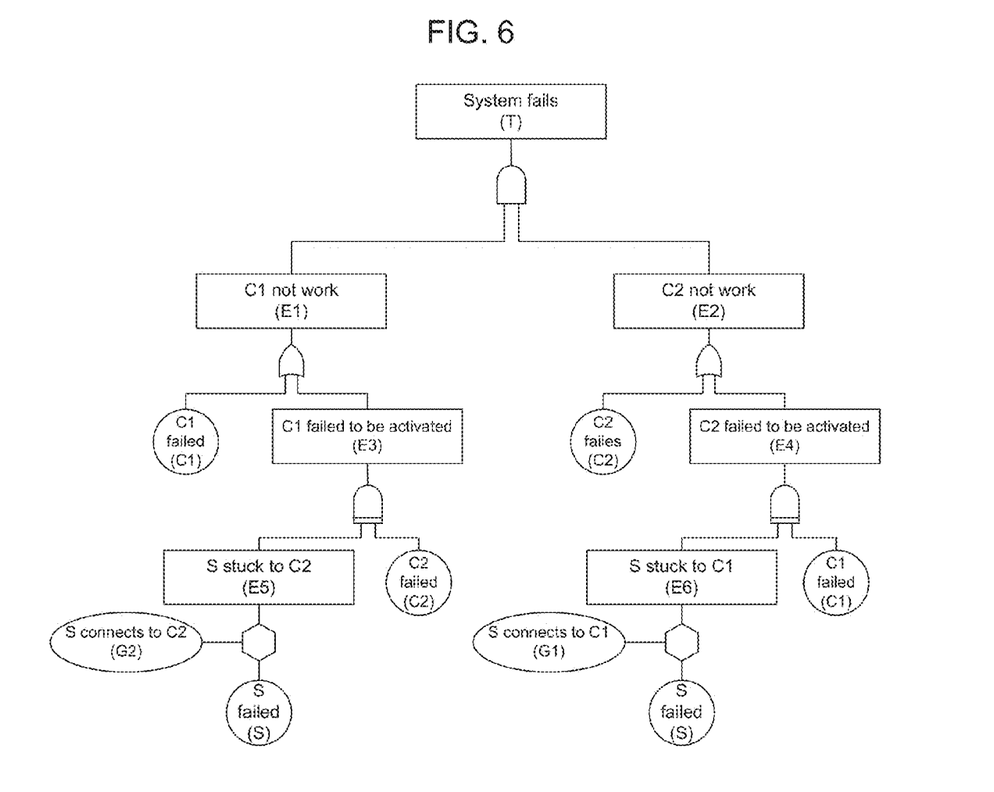
FIG. 6 illustrates a fault tree, being a specific example.

We assume that a fault tree of the example system is shown in FIG. 6. The top event (root) of the fault tree, T (i.e., system fails) can be decomposed by an AND gate with two sub events, E1 (component C1 does not work) and E2 (component C2 does not work).

The event E1 can be decomposed by OR gate with two sub events, C1 (component C1 fails) and E3 (component C1 is failed to be activated). Note that the event C1 is a basic event of a component failure which needs not to be further decomposed.

The event E3 can be further decomposed by a Priority AND (PAND) gate with two sub events, E5 (switch S is stuck to C2) and C2 (component C2 fails), in which it states that if E5 happens before C2, then E3 will happen. From a reverse point of view, the PAND gate represents the knowledge depicted in the system model shown in FIG. 5, i.e., if the event C2 happens before the event E5, then the switch S will change to and activates the component C1 such that the top event E3 will not happen (i.e., negated).

The event E5 could be further decomposed by an INHIBIT gate with a conditional event G2 (switch S is connected to C2) and a basic event S (switch S is failed), i.e., if the switch S fails when it is connected the component C2, then it will stuck to C2. The right-hand sub tree with the top event T can be analyzed in a similar way which could be regarded as a kind of dual tree of the left-hand sub tree with the event E1.

Figure 7:
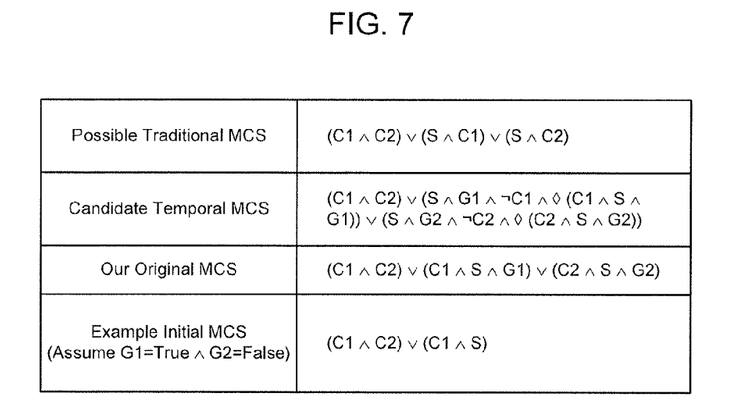
FIG. 7 is a view illustrating the different MCS of the fault tree.

Based on the fault tree of FIG. 6, three kinds of MCS could be calculated in terms of traditional FTA, temporal logic, and our proposed method, respectively as shown in FIG. 7. The calculation patterns of MCS of the INHIBIT gates with conditional events and PAND gates of these three methods are presented in FIG. 8 for comparison.

Figure 8:
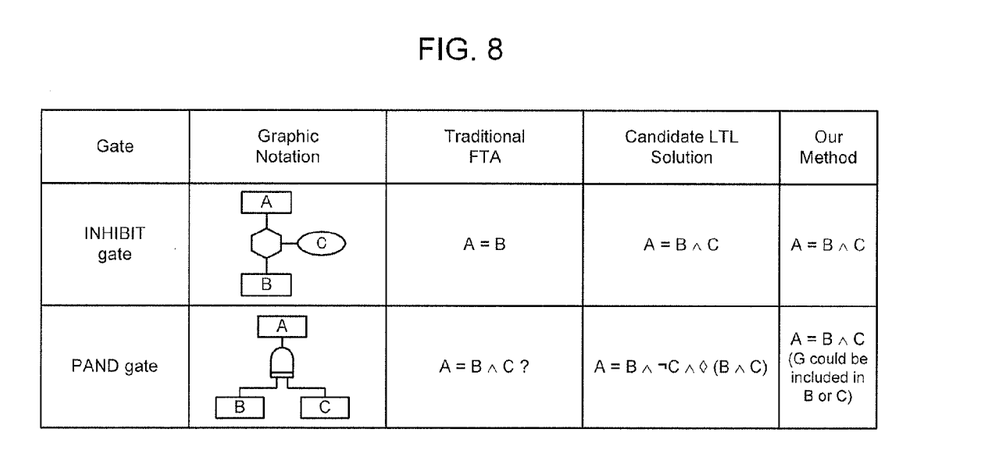
FIG. 8 is a view illustrating a method of calculating an INHIBIT gate and a PAND gate each having the different MCS.

Note that in FIG. 7 and FIG. 8, traditional FTA does not include conditional events in the MCS, because in the Fault Tree Handbook, a minimal cut set is defined as a smallest combination of (only) component failures. According to this definition, the resulting MCS of traditional FTA are only the necessary but not sufficient conditions for the top events. Moreover, there is no clear definition about the MCS of PAND gates, simply because the rationale of traditional FTA, i.e., Boolean logic, has difficulty to represent the sequential dependency (temporal relationship) between different events. Some existing FTA tools, such as OpenFTA, simply handle PAND gates as AND gates for the calculation of MCS, but such a simplification without any formal proof or explanation may cause semantic inconsistency and conceptual misunderstanding, that is, even the sub events of a PAND gate do not occur in the particular order specified by the PAND gate, the top event will still happen.

Temporal logic could be used to handle the sequential dependency between events, and the candidate temporal MCS for the example fault tree and the PAND gate are presented in FIG. 7 and FIG. 8, respectively. Note that we use linear temporal eventually operator ◇ in the temporal MCS. One potential trouble of the temporal MCS is that, as for the calculation of runtime MCS, it requires to observe the sequences rather than combinations of component failures, which inevitably increases the computation cost in general.

In our proposed method, we include the conditional events in the original MCS. As for the PAND gate, we propose that a PAND gate can be interpreted as a conjunction of the input events and some implicit conditional events (if they are not included in the input events), provided that the dynamic behavior of the system satisfies the Markov property. In other words, a PAND gate can be transformed into a standard AND gate with some additional implicit conditional events. If the input events occur in a different order which is not allowed by the PAND gate, then some of the conditional events must be negated; otherwise the different order can also result in the output event of the PAND gate according to the Markov property, which in return contradicts the semantics of the PAND gate. By observing the input events and the conditional events, the order of the input events of the PAND can be omitted for the runtime analysis of the fault tree. For instance, in regard to the PAND gate connecting E3 with input events E5 and C2 shown in FIG. 6, the implicit conditional event is G2 (i.e., the switch is connected to the component C2), and the PAND gate can be interpreted as E3=E5^C2^G2=S^G2^C2. If C2 (i.e., component C2 is failed) occurs before E5 (i.e., switch S is stuck to component C2), then the switch S will change to the component C1 according to the system operational semantics depicted in FIG. 5. In this case, the conditional event G2 will be negated, and the MCS of the PAND gate (i.e., S^G2^C2) will be discarded in the MCS of the fault tree.

After calculating the original MCS, the system scans the original MCS, and the conditional events of the original MCS are extracted as guard conditions to be observed by the aforementioned history and monitoring means 130 (Step B3). In this example, the guard conditions are the status of the switch, G1 and G2, i.e., whether the switch is connected to the component C1 or C2. We assume that initially, the switch is connected to C1, and the initial MCS of the fault tree can be calculated by reducing the original MCS with the evaluations that G1=True and G2=False, i.e., (C1^C2)(S^C1) as shown in the state 1 of FIG. 9 (Step B4). The initial MCS is saved into the aforementioned storage means 122 as the most recent MCS for further calculation of runtime MCS (Step B5).

Suppose after initialization, the first event observed by the aforementioned history and monitoring means 130 is C1, i.e., component C1 is failed (Step B6), and the change of guard condition from G1 to G2 is also detected, then the current MCS can be calculated by reducing the original MCS with the evaluations of G2=True, G1=False, and the simplified history C1=True (Step B8). The result is C2 which is also the only one single point of failure of the system, i.e., if the component C2 fails in this situation, then the system will be failed (see state 1.1 of FIG. 9).

Figure 9:
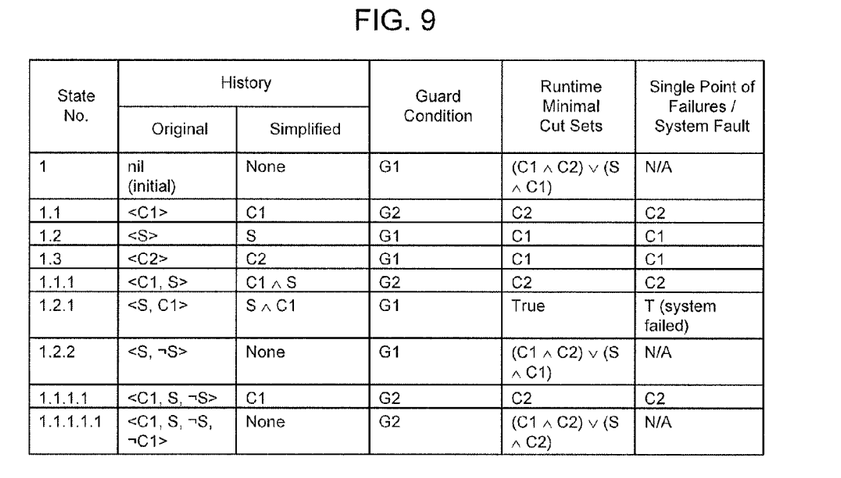
FIG. 9 is a view illustrating an example of a runtime analysis result.

Suppose that the second event detected by the system is S, i.e., the switch is failed, and there is no change made to the guard conditions, then the current MCS could be calculated by reducing the most recent MCS, i.e., C2, with the evaluation of the most recent event S=True (Step B7), and the result is still C2 (see state 1.1.1 of FIG. 9).

Suppose that the third event detected by the system is ¬S (note that for simplicity, we use the negation symbol, ¬, to denote a recovery of a component), i.e., the switch is recovered (repaired), and the current guard condition is G2, then the current MCS could be calculated by reducing the original MCS with the evaluations of G2=True and the simplified history C1=True (Step B8), and the result is still C2 (see state 1.1.1.1 of FIG. 9).

Note that the original history is a sequence of component failures and recoveries, while the simplified history consists of a combination of only component failures, i.e., in which components are still failed in the current state. Our runtime MCS calculation is actually based on the simplified history with necessary observations of guard conditions, which is more efficient than the methods resorting to sequences of component failures, such as the one with temporal MCS.

Figure 10:
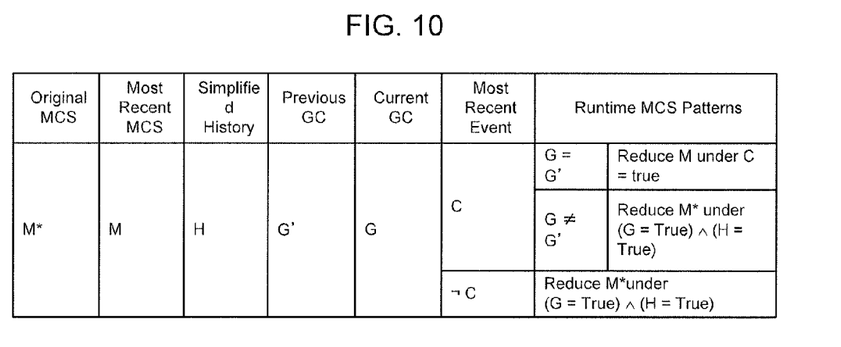
FIG. 10 is a view illustrating runtime MCS calculation patterns.

The runtime MCS calculation patterns with respect to the above three cases are presented in FIG. 10.

The present invention can be used to analyze system reliability in a qualitative way and find out critical components at runtime, with the implementation of the aforementioned fault tree analysis means generating the original MCS of the fault tree of the system, the aforementioned history and monitoring means observing the history of component failures and recoveries as well as the status of the guard conditions, and the aforementioned runtime analysis means calculating the current MCS at runtime.

Further, while each unit was configured with hardware in the above-described implementation modes, it may be configured with a program and a CPU that perform an operation similar to that of each unit.

Further, the content of the above-mentioned exemplary embodiments can be expressed as follows.

(Supplementary Note 1)

A system for analyzing system reliability at runtime to find out critical components of a system based on a history of component failures and recoveries and necessary observations of some guard conditions which are normal states of some components, comprising:

a fault tree input means that inputs fault trees of the system to be analyzed;

a fault tree analysis means that calculates original and runtime minimal cut sets (MCS) of the fault trees of the system; and a history and monitoring means that records the history of component failures and recoveries, and observes the status of the guard conditions included in said original MCS.

(Supplementary Note 2)

The system according to Supplementary note 1, comprising:

an original MCS analysis means that calculates the original MCS;

a storage means that saves the calculated most recent MCS; and a runtime MCS analysis means that calculates the current MCS of the fault tree based on said original or most recent MCS to enhance efficiency of calculation in place of said fault tree analysis means.

(Supplementary Note 3)

The system according to Supplementary note 1 or Supplementary note 2, wherein said history of component failures and recoveries is represented by a set of observations of component failures, said system comprising a monitoring means that observes all the failure status of the components and the status of the guard conditions included in said original MCS in place of said history and monitoring means.

(Supplementary Note 4)

The system according to one of Supplementary note 1 to Supplementary note 3, further comprising an output means that transforms the result of said runtime analysis means into other appropriate forms for reporting to users or further analysis.

(Supplementary Note 5)

A fault tree analysis method of analyzing system reliability at runtime to find out critical components of a system based on a history of component failures and recoveries and necessary observations of some guard conditions which are normal states of some components, comprising:

inputting fault trees of the system to be analyzed;

calculating original and runtime minimal cut sets (MCS) of the fault trees of the system; and recording the history of component failures and recoveries, and observing the status of the guard conditions included in said original MCS.

(Supplementary Note 6)

The fault tree analysis method according to Supplementary note 5, comprising:

calculating the original MCS;

saving the calculated most recent MCS; and calculating the current MCS of the fault tree based on said original or most recent MCS to enhance efficiency of calculation in place of said fault tree analysis means.

(Supplementary Note 7)

The fault tree analysis method according to Supplementary note 5 or Supplementary note 6, wherein said history of component failures and recoveries is represented by a set of observations of component failures, said method comprising observing all the failure status of the components and the status of the guard conditions included in said original MCS.

(Supplementary Note 8)

The fault tree analysis method according to one of Supplementary note 5 to Supplementary note 7, further comprising transforming the result of said runtime analysis means into other appropriate forms for reporting to users or further analysis.

(Supplementary Note 9)

A program of a fault tree analysis method of analyzing system reliability at runtime to find out critical components of a system based on a history of component failures and recoveries and necessary observations of some guard conditions which are normal states of some components, said program causing an information processing device to execute:

a process of inputting fault trees of the system to be analyzed;

a process of calculating original and runtime minimal cut sets (MCS) of the fault trees of the system; and a process of recording the history of component failures and recoveries, and observing the status of the guard conditions included in said original MCS.

Above, although the present invention has been particularly described with reference to the preferred embodiments, it should be readily apparent to those of ordinary skill in the art that the present invention is not always limited to the above-mentioned embodiments, and changes and modifications in the form and details may be made without departing from the spirit and scope of the invention.

This application is based upon and claims the benefit of priority from Japanese patent application No. 2010-099259, filed on Apr. 22, 2010, the disclosure of which is incorporated herein in its entirety by reference.

REFERENCE SIGNS LIST 110 fault tree input means
120 fault tree analysis means
130 history and monitoring means
140 output means
121 original MCS analysis means
122 storage means
123 runtime MCS analysis means

The invention claimed is:

1. A system for analyzing system reliability at runtime to determine critical components of a system based on a history of component failures and recoveries and necessary observations of some guard conditions which are normal states of some components, comprising:

a fault tree input unit configured to input fault trees of the system to be analyzed;

a fault tree analyzer configured to calculate original and runtime minimal cut sets (MCS) of the fault trees of the system; and a history and monitoring unit configured to record the history of component failures and recoveries, and to observe the status of the guard conditions included in said original MCS;

wherein one or more of the fault tree input unit, the fault tree analyzer and the history and monitoring unit are implemented via a processor.

2. The system according to claim 1, further comprising:

an original MCS analyzer configured to calculate the original MCS;

a storage configured to save the calculated most recent MCS; and a runtime MCS analyzer configured to calculate the current MCS of the fault tree based on said original or most recent MCS to enhance efficiency of calculation in place of said fault tree analyzer;

wherein one or more of the original MCS analyzer, the storage and the runtime MCS analyzer are implemented via a processor.

3. The system according to claim 1, wherein:

said history of component failures and recoveries is represented by a set of observations of component failures, said system comprising a monitoring unit, implemented via a processor, configured to observe all the failure status of the components and the status of the guard conditions included in said original MCS in place of said history.

4. The system according to claim 2, further comprising an output unit, implemented via a processor, configured to transform the result of said runtime MCS analyzer into other appropriate forms for reporting to users or further analysis.

5. A fault tree analysis method of analyzing system reliability at runtime to find out critical components of a system based on a history of component failures and recoveries and necessary observations of some guard conditions which are normal states of some components, comprising:
- inputting fault trees of the system to be analyzed;
- calculating original and runtime minimal cut sets (MCS) of the fault trees of the system; and
- recording the history of component failures and recoveries, and observing the status of the guard conditions included in said original MCS.

6. The fault tree analysis method according to claim 5, comprising:
- calculating the original MCS;
- saving the calculated most recent MCS; and
- calculating the current MCS of the fault tree based on said original or most recent MCS to enhance efficiency of calculation.

7. The fault tree analysis method according to claim 5, wherein said history of component failures and recoveries is represented by a set of observations of component failures, said method comprising observing all the failure status of the components and the status of the guard conditions included in said original MCS.

8. The fault tree analysis method according to claim 6, further comprising transforming the result of said calculated current MCS of the fault tree into other appropriate forms for reporting to users or further analysis.

9. A non-transitory computer readable storage medium storing a program of a fault tree analysis method of analyzing system reliability at runtime to find out critical components of a system based on a history of component failures and recoveries and necessary observations of some guard conditions which are normal states of some components, said program causing an information processing device to execute:
- a process of inputting fault trees of the system to be analyzed;
- a process of calculating original and runtime minimal cut sets (MCS) of the fault trees of the system; and
- a process of recording the history of component failures and recoveries, and observing the status of the guard conditions included in said original MCS.

* * * * *